(12) United States Patent
Shaw et al.

(10) Patent No.: US 6,434,946 B1
(45) Date of Patent: Aug. 20, 2002

(54) METHOD FOR MAKING AN ARTICLE ASSEMBLY WITH A BRAZED JOINT AND BRAZED ASSEMBLY AND PREFORM

(75) Inventors: Mark Richard Shaw; David Edwin Budinger, both of Loveland, OH (US); Ronald Daniel Regan, Beverly, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/827,849

(22) Filed: Apr. 6, 2001

(51) Int. Cl.[7] .............................................. B23K 31/02
(52) U.S. Cl. ...................... 60/752; 228/227; 228/249; 29/DIG. 4
(58) Field of Search ................. 228/249, 227; 29/DIG. 4; 60/752

(56) References Cited

U.S. PATENT DOCUMENTS 3,909,917 A * 10/1975 Lebedev ..................... 228/216
5,323,604 A * 6/1994 Ekstedt ....................... 60/39.36
6,135,345 A * 10/2000 Shimizu ...................... 228/245

* cited by examiner

Primary Examiner—Ehud Gartenberg
(74) Attorney, Agent, or Firm—Rodney M. Young; Lee H. Sachs; William Scott Andes

(57) ABSTRACT

An article assembly comprising a plurality of members includes a multi-layered brazed joint provided in the assembly between a first member that can be affected adversely by thermal exposure at a limiting and a second member requiring exposure, such as for brazing, at least at the limiting temperature. The assembly is provided with a multi-layered brazed joint directly or indirectly between such members by brazing to the second member a second brazing alloy that can be brazed at a temperature required to braze the second member, providing a preform. The assembly is brazed to include the first member by brazing members of the assembly together with a first brazing alloy, brazing at a temperature less than the limiting temperature, brazed at the second brazing alloy.

19 Claims, 1 Drawing Sheet

METHOD FOR MAKING AN ARTICLE ASSEMBLY WITH A BRAZED JOINT AND BRAZED ASSEMBLY AND PREFORM

BACKGROUND OF THE INVENTION

This invention relates to brazing into an assembly at least two members of different alloys, each having a metallurgical thermal capability different from the other. More particularly, it relates to brazing into an assembly such members in a high temperature operating turbine engine component such as a gas turbine engine combustor.

Designers of brazed assemblies of a plurality of members select for use in manufacture of the assembly one or more brazing alloys the highest required brazing temperature of which will not adversely affect any required member characteristic. Such selection preserves the integrity and usefulness of the brazed assembly. For example, a "member characteristic", as that term is used herein, that can be adversely affected by excessive thermal exposure include such "metallurgical features", as that term is used herein, as mechanical and/or physical properties, including but not limited to, grain growth, relief of work in the structure, incipient melting, solutioning of at least a portion of the alloy microstructure, recrystallization, reduction of strength and/or fatigue properties, etc.

In some desired assemblies, it has been recognized that at least one member requires use of a brazing alloy that has a brazing temperature greater than a temperature, herein called a "limiting temperature", that will adversely affect a member characteristic. In one specific example, it was desired to use for a member in the brazed assembly of a gas turbine engine combustor, an alloy requiring a brazing temperature greater than a temperature at which excessive grain growth would occur in another of the members of the assembly.

BRIEF SUMMARY OF THE INVENTION

One form of the present invention comprises a method for making an article assembly, and a preform, including a brazed joint. the assembly comprises a first member of a first substrate alloy having a limiting temperature above which at least one adverse member characteristic occurs adversely affecting at least one metallurgical feature of the first substrate alloy. The first alloy can be brazed with a first brazing alloy at a first brazing temperature less than the limiting temperature. Included in the assembly is a second member of a second substrate alloy requiring brazing at a second brazing temperature greater than the limiting temperature. One form of the method comprises the steps of bonding to a surface of the second substrate alloy a second brazing alloy that can be brazed at the second brazing temperature greater than the limiting temperature to provide a preform. Then the assembly is brazed to provide the brazed joint by brazing together the second brazing alloy and the first brazing alloy at the first brazing temperature less than the limiting temperature.

Another form of the present invention is an article assembly comprising a plurality of members and at least one brazed joint in the form of a multi-layered brazed joint. The assembly comprises the first member and the second member with a brazed joint at least at the second member. The multi-layered brazed joint comprises the second brazing alloy bonded to the second member, defining the preform, and the first brazing alloy bonded to the second brazing alloy.

DETAILED DESCRIPTION OF THE INVENTION

Figure 1:
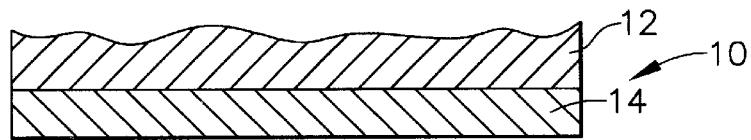
FIG. 1 is a diagrammatic, fragmentary sectional view of the second member of the second alloy in an assembly, with the second brazing alloy bonded to a surface of the second member.

One application of the present invention is in a brazed assembly of members of a gas turbine engine combustor of the type currently used and widely described in the gas turbine engine art. For example, such combustors have been shown in a variety of U.S. Patents including U.S. Pat. No. 5,289,687—Kress et al. (patented Mar. 1, 1994); U.S. Pat. No. 5,355,668—Weil et al. (patented Oct. 18, 1994); and U.S. Pat. No. 5,329,773—Myers et al. (presented Jul. 19, 1994). Members of such an assembly, as are other members of a gas turbine engine operating at relatively high temperatures, are made of a substrate alloy based on at least one element selected from Fe, Co, and Ni. Generally forms of such high temperature alloys are referred to as superalloys.

One evaluation of a gas turbine engine combustor related to a combustor dome plate deflector made of a commercially available substrate alloy identified as Mar-M-509 alloy, and brazed in an assembly with a combustor swirler, in one example through an intermediate substrate alloy member of a commercially available Co base alloy sometimes called L-605 alloy. Manufacture of the assembly used a brazing alloy, commercially available as AMS 4777 brazing alloy (nominally by weight about 4.5% Si, 7% Cr, 3% B, 3% Fe with the balance essentially Ni and incidental impurities), which was brazed at a temperature, for example in the range of about 1875–1925° F., less than a limiting temperature of about 1950° F. and above for all of the substrate alloys in the assembly. As a result of such brazing, member characteristics were not adversely affected to the extent metallurgical features were adversely affected.

However, it was desired to increase the durability of the assembly by substituting for the dome plate deflector substrate alloy a high temperature Ni base superalloy sometimes referred to a base superalloy. Forms of such alloy are more fully described in U.S. Pat. No. 5,173,255—Ross et al. (patented Dec. 22, 1992). Brazing evaluations related to N-5 alloy including use of brazing alloys brazing in a temperature range as that for AMS 4777, all less than the limiting temperature of the substrate alloys of the assembly, disclosed that incomplete wetting of the N-5 alloy surface resulted. It was recognized that exposure of the N-5 alloy surface to a higher brazing temperature which was greater than the limiting temperature, for example at 1950° F. and above, for other substrate alloys in the assembly was required to adequately wet for brazing the surface of a member of the N-5 Ni base alloy.

Members made of N-5 Ni base superalloy had been successfully brazed using other brazing alloys or brazing alloy mixtures of powders. For example, such other brazing alloys include commercially available Ni—Si—Cr type brazing alloys, a form of which sometimes is referred to as GE-81 alloy (nominally by weight about 18–20% Cr, 9.5–10.5% Si, with the balance essentially Ni). A form of such alloy is described in U.S. Pat. No. 3,155,491, Hoppin III et al (patented Nov. 3, 1964). Such brazing alloys have been used alone or in a powder mixture, for example with substantially Ni powder, to enable what is known in the art as liquid phase sintering. In that method, a lower melting powder of the mixture, such as the GE-81 alloy powder, melts about the substantially unmelted Ni powder. However, the brazing temperature for such alloys or mixtures generally was at least about 2000° F., typically nominally 2100–2150° F., and above the limiting temperature of at least one of the substrate alloys in the assembly. For example, there was concern about excessive grain growth at such temperature in a dome plate substrate alloy, commercially available as Inconel 625 alloy, of which a member of the combustor assembly was constructed.

Forms of the present invention provide a substantially multi-layer brazed joint between cooperating members of an assembly. In a method form, a higher melting brazing alloy (including a powder mixture within its meaning), for example GE 81 alloy or mixture including GE 81 alloy, brazing at a temperature above the limiting temperature of at least one member of the assembly, is bonded to a surface of a member requiring brazing at a temperature greater than a limiting temperature of at least one of the members. Then the higher melting brazing alloy thus disposed is brazed to at least another member of the assembly, generally without remelting the higher temperature brazing alloy. The present invention will be more fully understood in connection with the drawing, all figures of which are diagrammatic, fragmentary sectional views. Included with the description of the drawing are specific examples of evaluations conducted in connection with forms of the present invention.

FIG. 1 is a view of a preform, shown generally at 10, for use in the practice of a form of the present invention. Preform 10 comprises a higher temperature second member 12 of a second substrate alloy, for example N-5 Ni base superalloy substrate, to which has been bonded a second brazing alloy 14, for example by brazing GE 81 alloy by liquid phase sintering in a mixture of powders at about 2100° F. for about 10 minutes.

Figure 2:
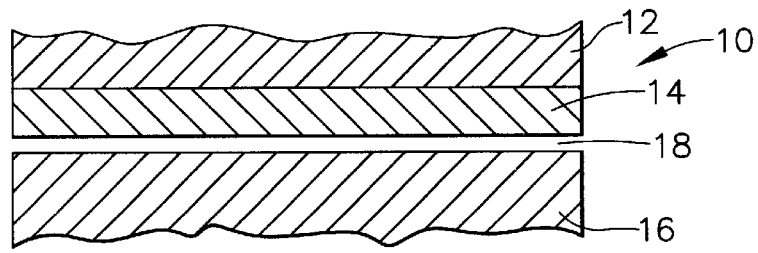
FIG. 2 is a diagrammatic, fragmentary sectional view of the structure of FIG. 1 in juxtaposition across a capillary type gap with the first member of the first alloy of an assembly.

In FIG. 2, preform 10 is placed in juxtaposition with a first member 16 across a narrow gap 18. For example, gap 18 is capable of drawing, and has been used in the evaluation to draw, a substantially molten alloy within gap 18 by capillary action for brazing together members 12 and 16 through brazing alloy 14.

Figure 3:
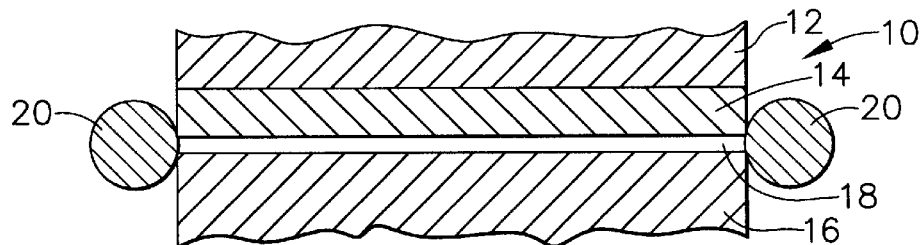
FIG. 3 is a diagrammatic, fragmentary sectional view of FIG. 2 with the first brazing alloy disposed as a brazing bead at the capillary type gap.
Figure 4:
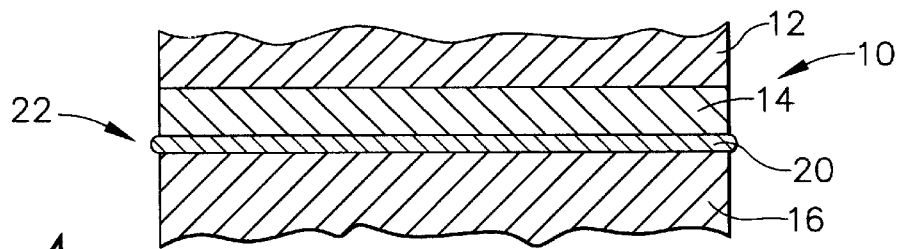
FIG. 4 is a diagrammatic, fragmentary sectional view as in FIG. 3 showing a portion of the article assembly with a brazed joint after the first brazing alloy has been melted and drawn into the gap.

FIG. 3 is a view of the arrangement of FIG. 2 with a bead or wire-like member of a first brazing alloy 20, for example AMS 4777 brazing alloy used in the evaluation, disposed at gap 18 prior to heating for brazing the juxtaposed portions together. After heating to melt first brazing alloy 20, for example in a range of about 1875–1925° F. for about 5–10 minutes, first brazing alloy 20 was drawn by capillary action into gap 18. This brazed first member 16 to second brazing alloy 14 which was substantially unmelted at the brazing temperature of first brazing alloy 20. The result, shown in FIG. 4, was an assembly, shown generally at 22, comprising first member 16 brazed to second member 12 through a two layer brazed joint comprising the combination of first brazing alloy 20 and second brazing alloy 14.

Figure 5:
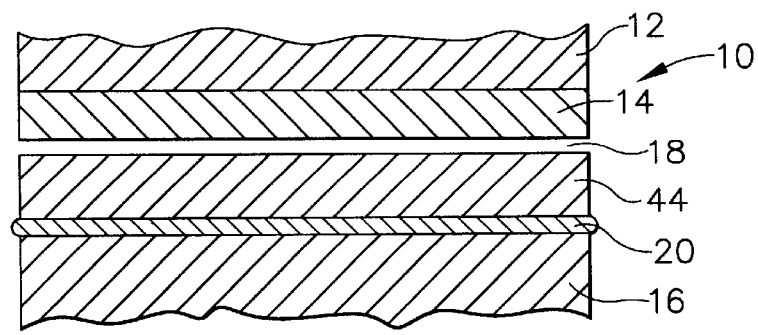
FIG. 5 is a diagrammatic, fragmentary sectional view similar to FIG. 2 in which the first alloy is brazed to an intermediate member that is in juxtaposition with the second alloy.

FIG. 5 is a view of another embodiment of an assembly, similar to the arrangement of FIG. 2. However, in the arrangement of FIG. 5 first member 16 is brazed in the assembly with intermediate member 44, for example L-605 Co base alloy used in an assembly such as the substrate alloy for a combustor swirler disposed between the first and second members. In one example using first brazing alloy 20, member 44 was brazed in the range of about 1875–1925° F. for about 10 minutes. Then the brazed combination of FIG. 5 was brazed in a subsequent assembly by repeating the method described above in connection with FIGS. 3 and 4.

Provision of such multi-layered brazed joint in an assembly of members made of alloys having different member characteristics and metallurgical features sensitive to a limiting temperature enables manufacture of brazed assemblies of improved durability.

The present invention has been described in connection with specific examples, combinations, materials and processing conditions. However, it should be understood that they are intended to be typical of rather than in any way limiting on the scope of the present invention. Those skilled in the various arts involved will understand that the invention is capable of variations and modifications without departing from the scope of the appended claims.

What is claimed is:

1. In a method for making an article assembly including a brazed joint, the assembly comprising:

a first member of a first substrate alloy having a limiting temperature above which at least one adverse member characteristic occurs adversely affecting at least one metallurgical feature of the first substrate alloy which can be brazed with a first brazing alloy at a first brazing temperature less than the limiting temperature; and, a second member of a second substrate alloy requiring brazing at a second brazing temperature greater than the limiting temperature;

the steps of:

bonding to a surface of the second substrate alloy a second brazing alloy that can be brazed at the second brazing temperature greater than the limiting temperature; and then, brazing the assembly to provide the brazed joint by brazing together the second brazing alloy and the first brazing alloy at the first brazing temperature less than the limiting temperature.

2. The method of claim 1 in which:

the first substrate alloy has a limiting temperature of at least about 1950° F.;

the second brazing alloy is bonded to the surface of the second substrate alloy at a temperature of at least about 1950° F. for a time sufficient to bond to the surface to provide a preform;

the first member is disposed in juxtaposition across a gap with the second brazing alloy of the preform; and then, the first member is brazed to the second brazing alloy across the gap at a temperature of no greater than about 1925° F. to provide a brazed assembly.

3. The method of claim 2 in which:

the first and second members of the assembly are made of at least one substrate alloy based on at least one element selected from the group consisting of Fe, Co, and Ni;

the first substrate alloy has a limiting temperature of at least about 1950° F.;

the first brazing alloy has a first brazing temperature less than 1950° F.; and, the second brazing temperature is greater than 1950° F.

4. The method of claim 3 in which the first and second members are made of different Ni base alloys.

5. The method of claim 4 for making a gas turbine engine combustor assembly including a brazed joint in which:

the first member is a combustor dome plate made of the first substrate alloy;

and the second members is a combustor dome plate deflector.

6. The method of claim 5 in which:

the second brazing alloy is bonded to the surface of the second substrate alloy at a temperature in the range of about 2000–2150° F. for a time sufficient to provide a bond and to provide a preform;

the first member is disposed in juxtaposition across a gap with the second brazing alloy of the preform; and then, the first member is brazed to the second brazing alloy across the gap at a temperature of no greater than about 1925° F.

7. The method of claim 5 in which:

the second brazing alloy is bonded to the surface of the second substrate alloy at a temperature in the range of about 2000–2150° F. for a time sufficient to provide a bond and to provide a preform;

the first member is bonded to an intermediate member at a temperature of no greater than about 1900° F.;

the intermediate member is disposed in juxtaposition across a gap with the second brazing alloy of the preform; and then the intermediate member is brazed to the second brazing alloy across the gap at a temperature of no greater than about 1925° F.

8. An article assembly comprising a plurality of members and at least one brazed joint, the assembly comprising:

a first member of a first substrate alloy having a limiting temperature above which at least one adverse member characteristic occurs affecting at least one metallurgical feature of the first substrate alloy which can be brazed with a first brazing alloy at a first brazing temperature less than the limiting temperature;

a second member of a second substrate alloy requiring brazing at a second brazing temperature greater than the limiting temperature; and, a multi-layered brazed joint in the article assembly at least at the second member;

the multi-layered brazed joint comprising:

a.) a second brazing alloy having a brazing temperature greater than the limiting temperature bonded to the second member to provide a preform, and, b.) a first brazing alloy having a brazing temperature less than the limiting temperature bonded to the second brazing alloy.

9. The article assembly of claim 8 in which the first and second members are made of at least one substrate alloy based on at least one element selected from the group consisting of Fe, Co, and Ni.

10. The article assembly of claim 9 in which the multi-layered brazed joint is between the first and second members.

11. The article assembly of claim 9 in which the multi-layered brazed joint is between the second member and an intermediate member carried in the assembly with the first member.

12. The article assembly of claim 9 in which the first and second brazing alloys each is based on Ni.

13. The article assembly of claim 12 in which the first and second substrate alloys each is based on Ni.

14. The article assembly of claim 9 in the form of a turbine engine combustor in which:

the first member is a combustor dome plate made of the first substrate alloy; and, the second member is a combustor dome plate deflector, the second brazing alloy of the multi-layered brazed joint being bonded with the combustor dome plate deflector; and, the second brazing alloy of the multi-layered brazed joint being bonded with the second brazing alloy.

15. The article assembly of claim 14 in which the multi-layered brazed joint is between the combustor dome plate and the combustor dome plate deflector.

16. The article assembly of claim 14 in which the multi-layered brazed joint is between the combustor dome plate deflector and an intermediate member carried in the assembly with the combustor dome plate.

17. The preform in the article assembly of claim 8 comprising the second brazing alloy bonded with the surface of the second substrate alloy.

18. The preform of claim 17 in which:

the second substrate alloy is a Ni base alloy requiring brazing at a temperature of at least about 1950° F.; and, the second brazing alloy is based on Ni and can be brazed at a temperature of at least about 1950° F.

19. The preform of claim 18 in which:

the second substrate alloy is a Ni base superalloy requiring brazing at a temperature of about 2000–2150° F.;

the second brazing alloy can be brazed at a temperature of at least about 2000° F.

* * * * *